(12) United States Patent
Anthony

(10) Patent No.: US 6,500,120 B1
(45) Date of Patent: Dec. 31, 2002

(54) BEAMFORMING SYSTEM USING ANALOG RANDOM ACCESS MEMORY

(75) Inventor: Michael P. Anthony, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/919,524

(22) Filed: Jul. 31, 2001

(51) Int. Cl.$^7$ .................................................. A61B 8/00
(52) U.S. Cl. ...................................... 600/437; 600/443
(58) Field of Search ................................. 600/437, 447, 600/448, 449, 455, 456, 432, 442

(56) References Cited

U.S. PATENT DOCUMENTS

| | | | |
|---|---|---|---|
| 5,261,281 A | 11/1993 | Katakura et al. | 73/626 |
| 5,345,426 A | 9/1994 | Lipschutz | 367/103 |
| 5,469,851 A | 11/1995 | Lipschutz | 128/661.01 |
| 5,573,001 A | 11/1996 | Petrofsky et al. | 128/661.01 |
| 5,997,479 A | 12/1999 | Savord et al. | 600/447 |
| 6,110,116 A | * 8/2000 | Wright et al. | 600/437 |
| 6,126,602 A | 10/2000 | Savord et al. | 600/447 |
| 6,221,018 B1 | * 4/2001 | Ramamurthy et al. | 600/443 |
| 6,277,073 B1 | * 8/2001 | Bolorforosh et al. | 600/437 |

OTHER PUBLICATIONS

Article entitled "A 4096 Cell Switched Capacitor Analog Waveform Storage Integrated Circuit" by Stuart A. Kleinfelder, 1990 IEEE, pp. 1230–1236.

* cited by examiner

Primary Examiner—Francis J. Jaworski
Assistant Examiner—Maulin Patel
(74) Attorney, Agent, or Firm—John Vodopia

(57) ABSTRACT

A simple, low cost ultrasound beamforming system uses an analog random access memory (RAM) element for each beamforming channel. The system includes a processor and an ultrasonic transducer array. The ultrasonic transducer array includes a plurality of transducer elements, each transducer element associated with one of a plurality of channels. The system also includes a beamformer adapted to receive an output signal from each of the plurality of transducer elements, and a delay element located in the beamformer and associated with each of the channels, where the delay element comprises an analog random access memory element.

11 Claims, 4 Drawing Sheets

BEAMFORMING SYSTEM USING ANALOG RANDOM ACCESS MEMORY

TECHNICAL FIELD

The present invention relates generally to ultrasound imaging systems and, more particularly, to a beamforming system using analog random access memory (RAM) elements for use in an ultrasound imaging system.

BACKGROUND OF THE INVENTION

Ultrasound imaging systems have been available for quite some time and are commonly used in nondestructive testing and medical applications. Medical ultrasound imaging allows the internal structure of the human body to be viewed non-invasively in real time. The ultrasound imaging system may be capable of either two or three-dimensional imaging.

Ultrasound imaging systems include, among other elements, an ultrasonic probe (including an ultrasonic transducer array), processing and control electronics (including transmit and receive beamformers), a display, and cabling that connects the ultrasonic probe to the processing and control electronics. Ultrasonic transducers are typically configured in either one-dimensional or two-dimensional arrays. A one dimensional transducer array includes one row of ultrasonic transducer elements arranged longitudinally. A two dimensional ultrasonic transducer array typically includes ultrasonic transducer elements arranged in columns and rows.

Regardless of the transducer array arrangement, during transmit pulses, electrical energy is converted by the transducer element to acoustic energy and transmitted in the direction of a target. The acoustic energy reflects from the target and returns to the transducer element. The acoustic energy received by the transducer element is converted to an electrical signal and passed as a receive signal to the receive processing circuitry associated with the ultrasound imaging system. A typical two-dimensional ultrasonic transducer array includes many hundreds or thousands of individual transducer elements. The electrical signal supplied by each transducer element is multiplexed to a smaller number of channels and then coupled to the processing circuitry.

When acoustic energy is received by each transducer element, it is often desirable to alter the characteristics of the signal to improve the ultrasonic image. One such manner for altering the signal is to delay the signal in one channel with respect to other channels. This is commonly referred to as beamforming. By using beamforming, components of the receive signal may be altered to improve the displayed ultrasound image. Conventional beamforming techniques typically use multiple beamforming elements that use complex digital processing circuitry for each receive channel. Unfortunately, this requires complicated processing components and tends to increase the cost of the ultrasound system.

Therefore, it would be desirable to have a low cost and simple beamforming system for each channel in an ultrasound imaging system.

SUMMARY

A simple, low cost ultrasound beamforming system uses an analog random access memory (RAM) element for each beamforming channel. The system includes a processor and an ultrasonic transducer array. The ultrasonic transducer array includes a plurality of transducer elements, each transducer element associated with one of a plurality of channels. The system also includes a beamformer adapted to receive an output signal from each of the plurality of transducer elements, and a delay element located in the beamformer and associated with each of the channels, where the delay element comprises an analog random access memory (RAM) element.

Other systems, methods, features, and advantages of the invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE INVENTION

The beamforming system of the invention can be implemented in hardware, software, firmware, or a combination thereof. In the preferred embodiment(s), the beamforming system is implemented using a combination of hardware and software or firmware that is stored in a memory and that is executed by a suitable instruction execution system. If implemented solely in hardware, as in an alternative embodiment, the beamforming system can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The software portion of the beamforming system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
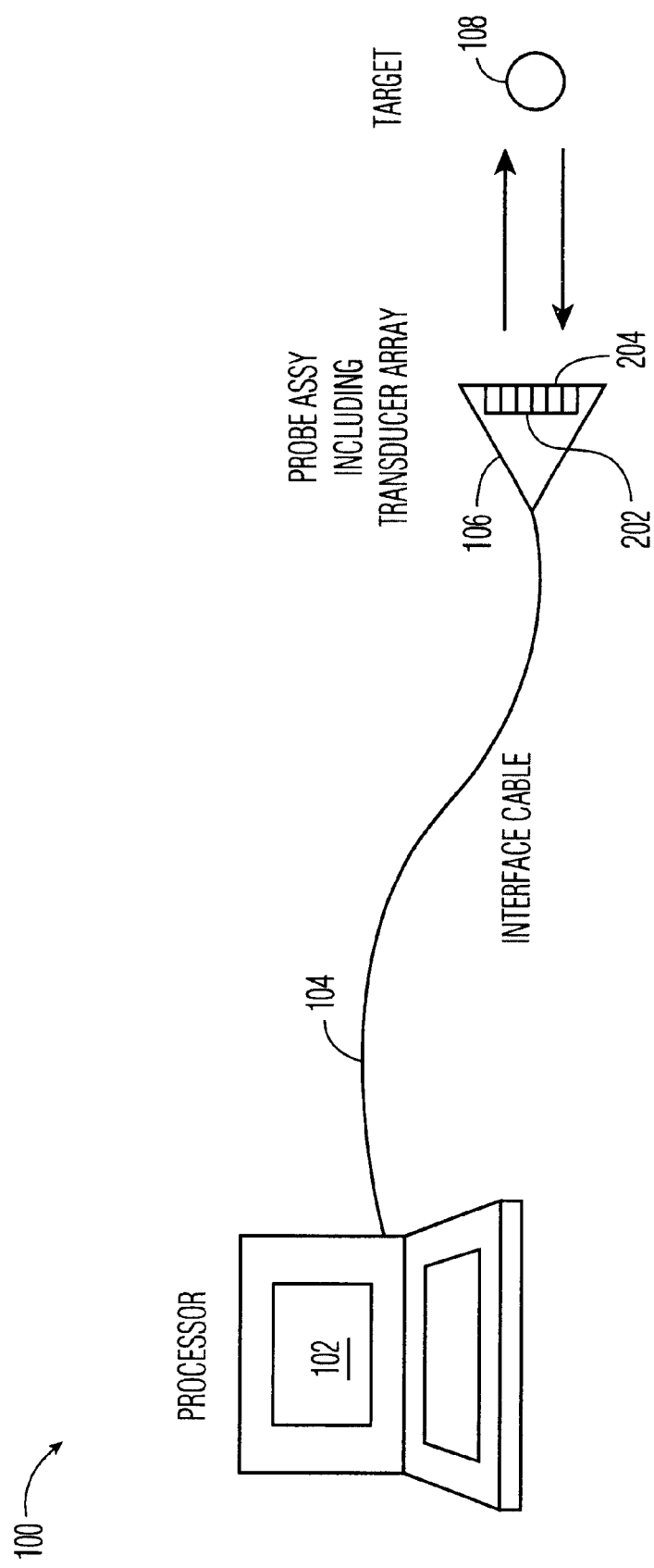
FIG. 1 is a graphical view illustrating a simplified ultrasound system.

Turning now to the drawings, FIG. 1 is a graphical view illustrating a simplified ultrasound system 100 constructed in accordance with an aspect of the invention. The ultrasound system 100 includes a processor 102 connected via interface cable 104 to probe assembly 106. The processor 102 can be a portable processor or can be a large, office style fully featured ultrasound processing system. The probe assembly 106 includes an ultrasound transducer array 202 including a plurality of ultrasound transducer elements; an exemplar one of which is illustrated using reference numeral 204. The ultrasound transducer array may be a one or two-dimensional array. Further, the ultrasound transducer array may be a two-dimensional array in which each element 204 in the array is individually controllable during both a transmit cycle and a receive cycle. Such an array is sometimes referred to as a "matrix array." A matrix array includes transducer elements arranged contiguously in two dimensions.

The probe assembly 106 transmits acoustic energy toward the target 108 and receives reflected acoustic energy from target 108. The acoustic energy reflected from target 108 is received by the transducer array 202 and converted by each transducer element 204 into an electrical signal. If the probe assembly includes processing circuitry, the received acoustic energy can be partially processed in the probe assembly and forwarded to the processor 102 for additional processing. After processing, an image generated from the received acoustic energy is then displayed on a display incorporated with processor 102.

Figure 2:
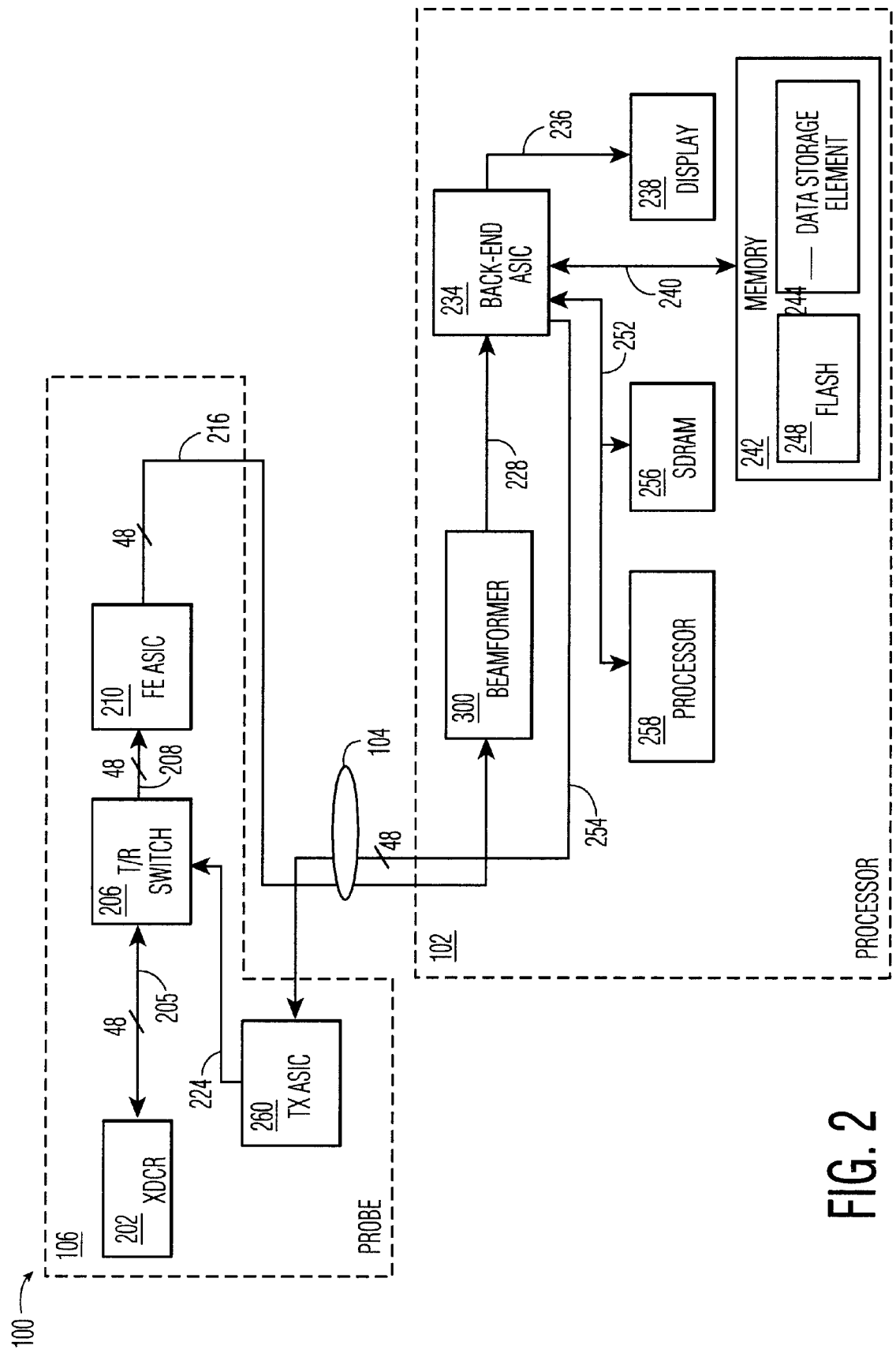
FIG. 2 is a schematic view illustrating the ultrasound system of FIG. 1.

FIG. 2 is a schematic view illustrating an exemplar architecture of the ultrasound system 100 of FIG. 1. The architecture illustrated in FIG. 2 is merely one ultrasound system architecture in which the present invention may be implemented, and it should be noted that other ultrasound system architectures can benefit from the invention. Probe assembly 106 includes a transducer array 202. The transducer array 202 includes a number of individual ultrasonic transducer elements 204 (see FIG. 1) arranged, for example but not limited to, as a phased array, linear array, curved linear array, or matrix array. It is contemplated that any transducer array can be used in the disclosed system, however, for discussion purposes, a 48-element phased array transducer will be described. The transducer array 202 communicates 48 signals (one channel for each transducer element) via connection 205 to a transmit/receive (T/R) switch 206. The T/R switch 206 provides the switching function that isolates the transmit energy from the receive energy. The T/R switch 206 communicates via connection 208 with a plurality of processors, commonly referred to as "front-end" ASICs, an exemplar one of which is illustrated as front-end ASIC 210. The front-end ASIC 210 is typically an analog ASIC device that receives a portion of the 48 ultrasonic transducer signals via connection 208. While illustrated using a single front-end ASIC 210, a plurality of front-end ASICs are typically employed to process all of the 48 ultrasonic transducer signals received via connection 208.

The front-end ASIC 210 performs power amplification, filtering and front-end time gain compensation (TGC) functions. TGC is required when receiving ultrasound signals from multiple depths within the target. In such an instance, in order to compensate for the increasing time of flight with respect to depth of the ultrasonic energy, gain is typically increased correspondingly. Time of flight refers to the amount of time necessary for transmitted ultrasonic energy to travel from the transducer element to the target and back to the transducer element. The front-end ASIC 210 supplies the amplified, filtered and gain compensated ultrasonic energy signals to beamformer 300 via connection 216.

The beamformer 300 includes a plurality of delay elements, each corresponding to one of the 48 channels, to process the signals representing the energy received from the transducer array 202. The beamformer 300 combines the processed signals from the various channels so that a single beamformed output signal is provided on connection 228. The single beamformed output signal on connection 228 is supplied to a processing device, commonly referred to as a "back-end ASIC" 234. The back-end ASIC 234 provides detection and additional back-end TGC functionality. Detection typically includes converting the radio frequency (RF) data stream produced on connection 232 into log magnitude data sampled for two-dimensional anatomical imaging as well as baseband quadrature data for use in two dimensional color flow imaging.

Back-end ASIC 234, which may be implemented using a plurality of ASICs, communicates via connection 252 with processor 258 and with static/dynamic random access memory (SDRAM) 256. The processor 258 controls the operation and functionality of the ultrasound system 100 by executing the code contained in SDRAM 256 and flash memory 248, and, for illustrative purposes only and provided as a non-limiting example, can be a series 7xx Power PC™ processor available from Motorola Corporation. The back-end ASIC 234 also communicates with memory element 242 via connection 240. The memory element 242 includes flash memory 248 and data storage element 244. The data storage element 244 can be used to initially load the flash memory 248 and can also be used to export information displayed on display 238. Although shown using discrete connections, processor 258, SDRAM 256 and memory 242 may also communicate over a common bus.

The back-end ASIC 234 also provides a scan converter function in order to provide an ultrasound image for display via connection 236 on display element 238. For example, the display element 238 can be a liquid crystal display (LCD) monitor used to view the ultrasound images generated by the probe assembly 106 and the processor 102. Although omitted for clarity, portable processor 102 also includes a power source, such as a battery or AC adapter for powering all the elements disclosed in FIG. 2. The back-end ASIC 234 also communicates with the transmit ASIC 260 via connection 254. Similar to that of the other ASICs described herein, the transmit ASIC 260 is typically implemented as a plurality of ASICs, but will be described using a single transmit ASIC 260 for simplicity. The transmit ASIC 260 develops the transmit pulses that are used to excite the transducer elements 204 in the transducer array 202. The transmit pulses are communicated to the T/R switch 206 via connection 224. The combination of connections 216 and 254 form interface cable 104 of FIG. 1. In some applications, the functionality of TX ASIC 260 could be incorporated into the front-end ASIC 210 and in other applications the functionality of the TX ASIC could be incorporated into the processor 102.

Figure 3:
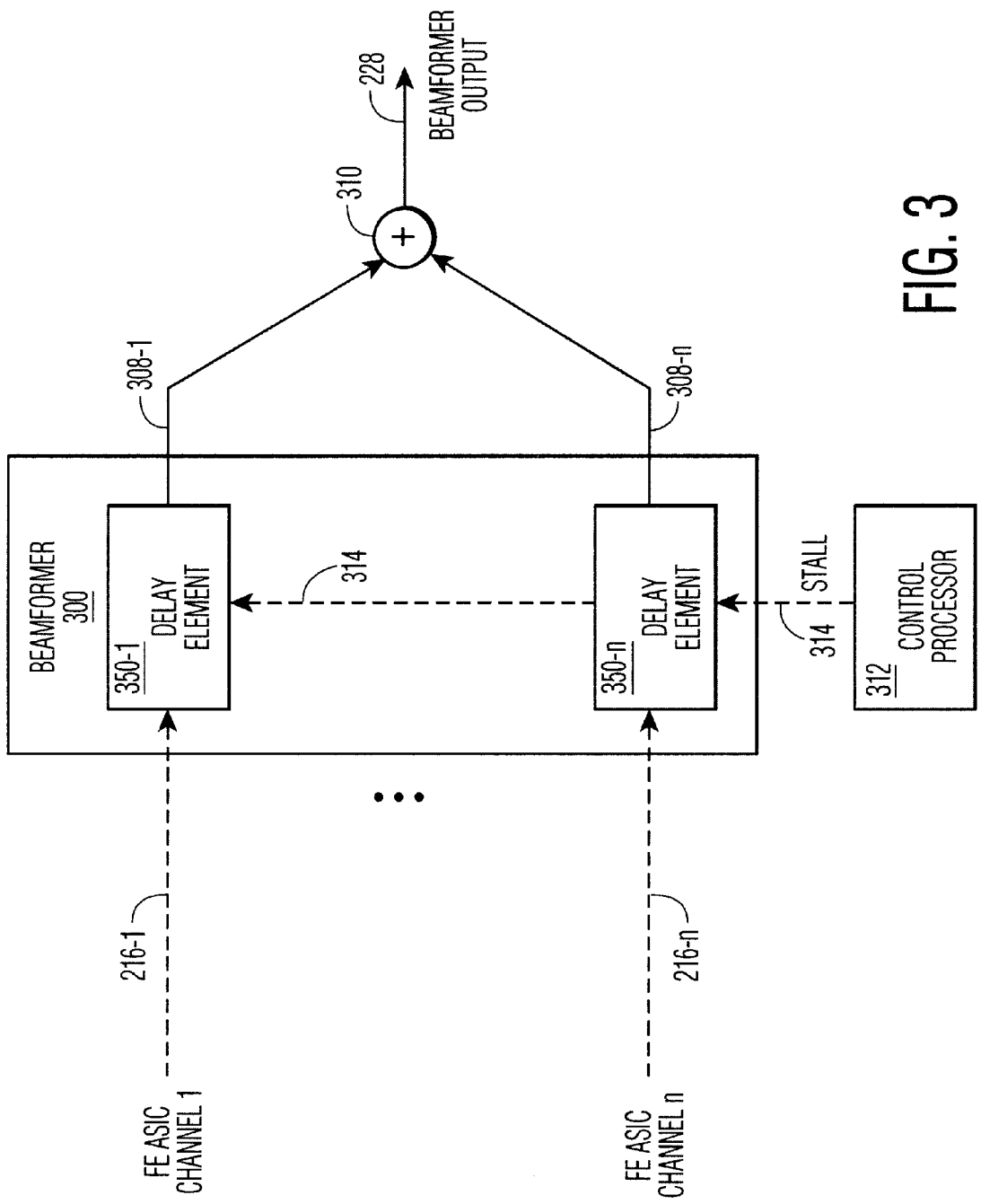
FIG. 3 is a schematic view illustrating the beamformer of FIG. 2.

FIG. 3 is a schematic view illustrating the beamformer 300 of FIG. 2. Each processing channel (1 through n)

receives signals originating from one of the transducer elements 204 after processing by one channel of the FE ASIC 210, via the connections 216-1 to 216-n. Accordingly, because the processing channels are similar, only channel will 216-1 be described. During receive signal processing, each transducer element 204-1 receives acoustic energy from the target and converts the acoustic energy into an electrical signal. After processing by one channel of the FE ASIC 210, the amplified received signal is supplied via connection 216-1 to a corresponding delay element 350-1 located within the beamformer 300. As illustrated in this example, there are 48 transducer elements such that each transducer element comprises one channel. Therefore, there are 48 channels, each having a signal supplied to one of the delay elements 350 in the beamformer 300. Accordingly, there are 48 delay elements 350 within beamformer 300.

Each delay element 350 comprises an analog random access memory (RAM) element and is controlled by a control signal supplied via connection 314 from a control processor 312. The signal on connection 314 temporarily stalls each delay element depending upon the signal from the control processor 312. At an appropriate time determined by the control processor 312 the output of the delay element 350-1 is supplied via connection 308-1 to a summing element 310. The summing element 310 combines the output of each delay element 350 and provides a beamformed signal output on connection 228.

Figure 4:
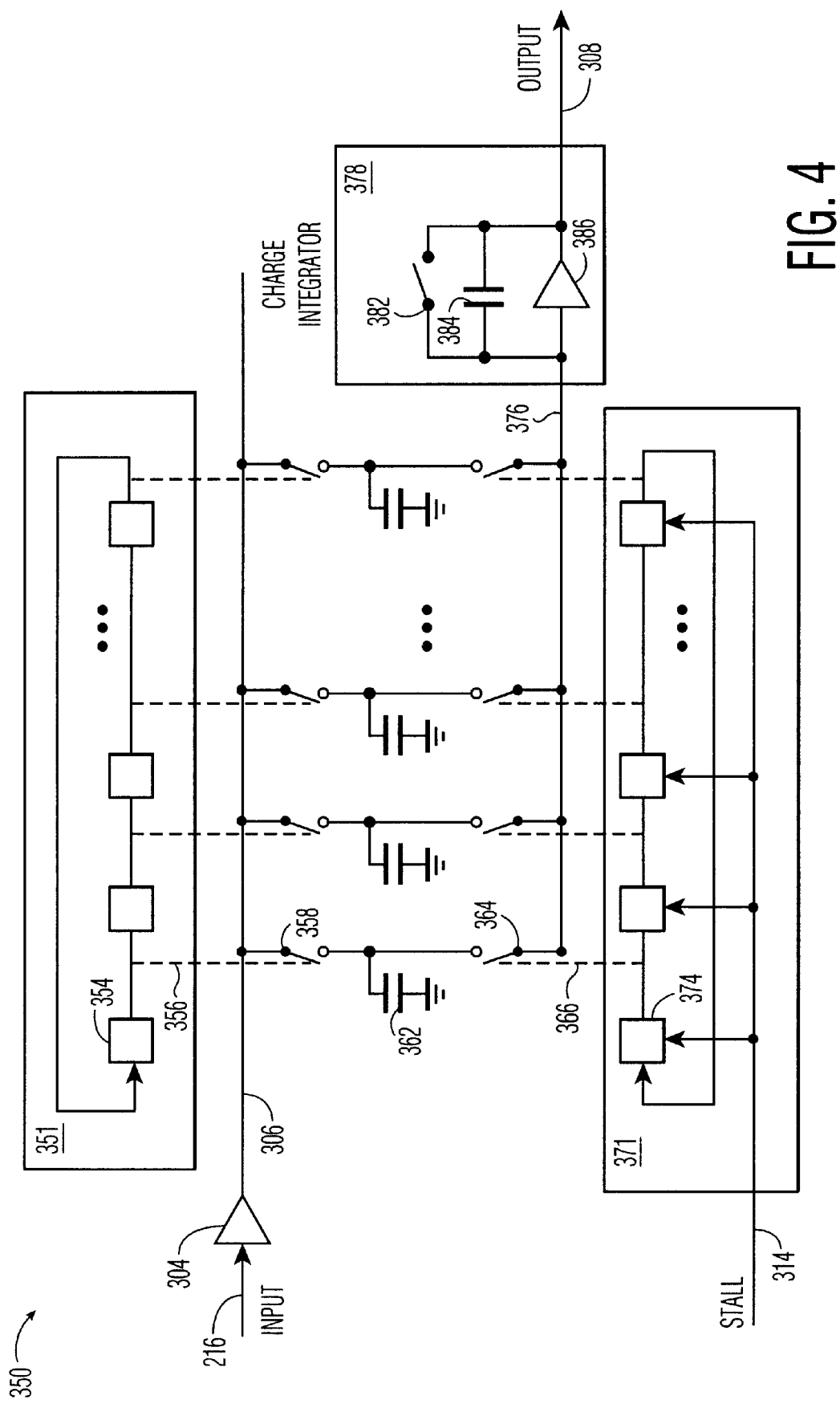
FIG. 4 is a schematic view illustrating the delay element of FIG. 3.

FIG. 4 is a schematic view illustrating the delay element 350 of FIG. 3. The received signal is supplied via connection 216 to amplifier 304. The output of amplifier 304 is supplied via connection 306 to a plurality of write switches; an exemplar one of which is illustrated using reference numeral 358. The input signal on connection 306 is sampled via the write switches 358 with each successive sample being held in a corresponding capacitive element 362. At a delayed time, the charge held in the capacitive element 362 is "read" from the capacitive element 362 via read switch 364. The signal is read out of the capacitive element 362 and sent on connection 376 for collection and processing by the charge integrator 378. The output of the charge integrator 378 on connection 308 is the delayed channel output of each delay element 350.

The write switches 358 are controlled by a digital logic "one," or a "logic one," circulating in the write shift register 351. The write shift register 351 includes a plurality of register locations, an exemplar one of which is illustrated using reference numeral 354. Each register location 354 corresponds to one of the write switches 358. When a logic one appears in the register location 354, the corresponding write switch 358 is activated via a signal on connection 356. When closed, the write switch 358 causes the input signal present on connection 306 to be stored in the corresponding capacitive element 362. Each write switch 358 is activated sequentially on successive sample clock signals because of the logic one circulating through each register location 354 of the write shift register 351. When each write switch 358 closes, the instantaneous value of the input signal on connection 306 is stored on a corresponding capacitive element 362. When the entire array of capacitive elements 362 are each written, the logic one circulates back to the first shift register location 354, thus activating the first write switch 358. Essentially, the write shift register 351 together with the capacitor array (comprising elements 362) comprise an "analog ring buffer." The length of the write shift register 351 is typically greater than the maximum delay required between channels to accommodate adequate focusing and steering of the received beam.

The read shift register 371 also carries a circulating "logic one," which is delayed with respect to the logic one circulating in the write shift register 351. Thus, at a time after a given sample is written to one of the capacitive elements 362, a corresponding read switch 364 associated with the capacitive element 362 is closed. The read switch 364 is controlled by the shift register location 374 via connection 366 in that when a "logic one" is present in the register location 374, the read switch 364 closes and the value stored in the capacitive element 362 is read out over connection 376. The charge on the capacitive element 362 at that moment is transferred via connection 376 to the charge integrator 378. The charge integrator 378 includes amplifier 386, capacitive element 384 and switch 382. The charge integrator 378 receives the successive signals on connection 376 and provides a continuous time-varying voltage output on connection 308. The delay between writing a given sample to the capacitive element 362 and reading it out of the capacitive element 362 is the focusing/steering delay applied to this signal channel. This delay has a resolution of one sample clock period, which in this embodiment is roughly ¼ $\lambda$, where $\lambda$ is the wavelength of the received signal. Additional delay resolution can be provided by selectable filter stages (not shown) analogous to the techniques used in digital scanning devices. However, in the system described herein, these filters are analog rather than digital.

The read delay time can be varied dynamically by the stall signal 314 supplied from the control processor (312 of FIG. 3) via connection 314. When the stall signal 314 is asserted, the "logic one" circulating in the read shift register 371 does not advance while the logic one circulating in the write shift register 351 continues to advance. The result is that the read out time falls farther behind the write time whenever the stall signal is asserted on connection 314. In this manner, the delay between the input on connection 216 and the output on connection 308 can be controlled. The output of the delay element 350 on connection 308 is added (in summing device 310 of FIG. 3), to form a combined signal and forms the beamformed signal output on connection 228 (FIG. 3).

The capacitor array and the bank of read, the write switches (for example switches 358 and 364) and the integrator 378 form an analog RAM. The specific addressing method described herein, using shift registers 351 and 371, is only one example of the use of such an analog RAM. Further, the method taught herein is useful in the context of ultrasound beamforming, but those of ordinary skill in the art will recognize that the analog RAM described herein will be useful in a variety of fields and endeavors.

It will be apparent to those skilled in the art that many modifications and variations may be made to the preferred embodiments of the present invention, as set forth above, without departing substantially from the principles of the present invention. For example, the present invention can be used in any ultrasound imaging system. All such modifications and variations are intended to be included herein within the scope of the present invention, as defined in the claims that follow.

What is claimed is:

1. A receive beamformer in an ultrasound imaging system comprising a delay element including analog random access memory (RAM), wherein the delay element further comprises:

a write shift register including a plurality of write shift register memory locations, the write shift register arranged as a circular shift register;

an input line receiving an input analog electrical signal representing a received acoustic signal;

a plurality of write switches connected to said input line, each of the write switches operably controlled by one of the plurality of write shift register memory locations of the write shift register, wherein, when a logical one is in a particular write shift register memory location, the write switch operably controlled by said particular write shift memory location is closed;

a plurality of capacitive elements, each of the capacitive elements connected to one of the plurality of write switches, wherein, when a write switch is closed, the connected capacitive element stores a substantially instantaneous value of the received input electrical signal on the input line;

a read shift register including a plurality of read shift register memory locations, the read shift register arranged as a circular shift register;

a plurality of read switches, each of the read switches connected to one of the plurality of capacitive elements and operably controlled by one of the plurality of read shift register memory locations of the read shift register, wherein, when a logical one is in a particular read shift register memory location, the read switch operably controlled by said particular read shift memory location is closed; and an output line outputting an output analog electrical signal and connected to said plurality of read switches, wherein, when a read switch is closed, the value of the stored electrical signal on the connected capacitive element is read out to said output line;

wherein the analog RAM is comprised of the input line, the plurality of write switches, the plurality of capacitive elements, the plurality of read switches, and the output line.

2. The delay element of claim 1, wherein each of the plurality of write switches closes in series in response to a logical one shifting through the plurality of the write shift register memory locations and each of the plurality of read switches closes in series in response to a logical one shifting through the plurality of the read shift register memory locations, and wherein there is a delay between the time that the write switch and the read switch connected to the same capacitive element close.

3. The delay element of claim 2, wherein the delay between the time that the write switch and the read switch connected to the same capacitive element close is the focusing steering delay applied to the received input electrical signal.

4. The delay element of claim 3, wherein the delay has a resolution of one sample clock period.

5. The delay element of claim 3, wherein the delay has a resolution of ¼ λ wherein λ is the wavelength of the received acoustic signal.

6. The delay element of claim 1, wherein the delay element is one of a plurality of delay elements in the receive beamformer, and wherein an output signal from each of a plurality of ultrasonic transducer elements is applied as an input analog electrical signal to each of the plurality of delay elements located in the receive beamformer.

7. The delay element of claim 2, further comprising:

a stall signal line operably connected to the read shift register, wherein a stall signal causes the logical one to not shift to a next memory location in the read shift register.

8. The delay element of claim 6, wherein a length of the write shift register is such that a total time it takes for a logical one to circularly shift back to the same memory location is greater than a maximum delay time between channels to accommodate adequate focusing and steering of a received beam, wherein a channel is an output signal of a single transducer element, and each of the plurality of delay elements receive one channel.

9. A method of receive beamforming using analog random access memory (RAM) in a delay element, the method comprising:

circulating a logical one through each of a plurality of memory locations in a write shift register arranged as a circular shift register, wherein, when the logical one is in a particular write shift register memory location, a corresponding one of a plurality of write switches connected to an input line closes, thereby latching a substantially instantaneous analog value of the input line in one of a plurality of capacitive elements, the one of the plural capacitive elements being connected to the closed write switch; and circulating a logical one through each of a plurality of memory locations in a read shift register arranged as a circular shift register, wherein, when the logical one is in a particular read shift register memory location, a corresponding one of a plurality of read switches connected to one of the plural capacitive elements closes, thereby latching, to an output line, a stored analog value in the connected one of the plurality of capacitive elements.

10. The method of claim 9, further comprising:

asserting a stall signal on a stall signal line operably connected to the read shift register, wherein the stall signal causes the logical one circulating through the read shift register to not shift to the next memory location in the read shift register.

11. A computer readable medium having a program for beamforming a received ultrasound signal using analog random access memory (RAM), the program comprising logic for:

controlling a write shift register including a plurality of write shift register memory locations, the write shift register arranged as a circular shift register, wherein the write shift register controls a plurality of write switches connected to an input line, each of the write switches operably controlled by one of the plurality of write shift register memory locations of the write shift register, wherein, when a logical one is in a particular write shift register memory location, the write switch operably controlled by said particular write shift memory location is closed; and controlling a read shift register including a plurality of read shift register memory locations, the read shift register arranged as a circular shift register, wherein the read shift register controls a plurality of read switches, each of the read switches operably controlled by one of the plurality of read shift register memory locations of the read shift register, wherein, when a logical one is in a particular read shift register memory location, the read switch operably controlled by said particular read shift memory location is closed;

wherein the analog RAM comprises the plurality of write switches, the plurality of read switches, and a plurality of capacitive elements, wherein each capacitive element is connected to one of the plurality of write switches and one of the plurality of read switches, wherein, when a write switch is closed, the connected capacitive element stores a substantially instantaneous value of the received input electrical signal on the input line, and wherein, when a read switch is closed, the value of the stored electrical signal on the connected capacitive element is read out to an output line.

* * * * *